US012521906B2

(12) United States Patent
Chou et al.

(10) Patent No.: US 12,521,906 B2
(45) Date of Patent: Jan. 13, 2026

(54) HAND-PRESS PLANER

(71) Applicant: THE KINGCRAFT MACHINERY COMPANY LIMITED, Taichung (TW)

(72) Inventors: Calvin Chou, Taichung (TW); Ming-Ta Chou, Taichung (TW)

(73) Assignee: THE KINGCRAFT MACHINERY COMPANY LIMITED, Taichung (TW)

( * ) Notice: Subject to any disclaimer, the term of this patent is extended or adjusted under 35 U.S.C. 154(b) by 312 days.

(21) Appl. No.: 18/370,899

(22) Filed: Sep. 21, 2023

(65) Prior Publication Data

US 2025/0100178 A1    Mar. 27, 2025

(51) Int. Cl.
*B27C 1/04* (2006.01)
(52) U.S. Cl.
CPC ........................ *B27C 1/04* (2013.01)
(58) Field of Classification Search
CPC .... B27C 1/02; B27C 1/04; B27C 1/14; B27C 5/02; B27C 5/04
See application file for complete search history.

(56) References Cited

U.S. PATENT DOCUMENTS

| | | | | |
|---|---|---|---|---|
| 6,494,239 B1 * | 12/2002 | Liao | ........................... | B27C 1/02 144/129 |
| 7,328,732 B2 * | 2/2008 | Chuang | ..................... | B27C 1/02 144/287 |
| 7,503,358 B2 * | 3/2009 | Chuang | ..................... | B27C 1/14 144/286.5 |
| 8,851,462 B2 * | 10/2014 | Liu | ........................... | B27C 1/14 411/277 |
| 2009/0266445 A1 * | 10/2009 | Chang | ....................... | B27C 1/12 144/287 |

FOREIGN PATENT DOCUMENTS

CN            201201282 Y        3/2009

OTHER PUBLICATIONS

Grizzly Industrial Inc, Model G0945/G0946/G0947 6" & 8" Benchtop Jointers Owner's Manual, Jul. 2021, https://web.archive.org/web/20220113223515/https://cdn0.grizzly.com/manuals/g0947_m.pdf (Year: 2021).*

* cited by examiner

*Primary Examiner* — Matthew Katcoff
(74) *Attorney, Agent, or Firm* — WPAT, PC

(57) ABSTRACT

A hand-press planer includes a base, a tool shaft, an elevation adjustment device, a first workbench, a fix seat, a second workbench, and a reinforcement device. The tool shaft is rotatably disposed on the base. The elevation adjustment device is disposed on one end of the base, and includes an adjustment seat and a movement seat. The movement seat is disposed on the adjustment seat and allowed to generate a relative rising and lowering movement. The first workbench is combined with the movement seat. The fix seat is disposed on another end of the base. The second workbench is combined with the fix seat. The reinforcement device is disposed on the base and connected with the adjustment seat. Therefore, the structural strength of the adjustment seat disposed on the base is improved.

18 Claims, 11 Drawing Sheets

HAND-PRESS PLANER

BACKGROUND OF THE INVENTION

1. Field of the Invention

The present invention relates to planers, and more particularly, to a hand-press planer with reinforcement device.

2. Description of the Related Art

Patent CN201201282Y discloses an adjustment device of hand-press planer platform, comprising two bases, a planer tool rotatably disposed between the bases, a front bearing unit disposed between the bases and a feeding platform disposed thereon, and a rear bearing seat disposed between the bases and an outputting platform disposed thereon.

In such structure, a driving seat of the front bearing unit is positioned between the two bases with two driving rods passing therethrough, and a fastening plate of the rear bearing seat is positioned between the two bases through other two driving rods passing therethrough. However, with such configuration, the planer generates a relatively large vibration when planning wood, causing the machine structure to be unstable, and even affecting the horizontal accuracy of the feeding platform and the outputting platform.

SUMMARY OF THE INVENTION

To improve the issues above, the present invention discloses a hand-press planer having a reinforcement device connected between the base and the adjustment seat to enhance the structural strength, thereby preventing the vibration effect generated during the planning operation and improving the stableness of the base.

For achieving the aforementioned objectives, an embodiment of the present invention provides a hand-press planer, comprising a base, a tool shaft, an elevation adjustment device, a first workbench, a fix seat, a second workbench, and a reinforcement device. The base comprises a front board and a rear board. The tool shaft is rotatably disposed on the base. The elevation adjustment device is disposed on one end of the base, and comprises an adjustment seat and a movement seat. The adjustment seat is disposed between the front board and the rear board, and the movement seat is disposed on the adjustment seat, so as to generate a relative rising and lowering movement. The first workbench is combined with the movement seat. The fix seat is disposed on another end of the base and arranged between the front board and the rear board. The second workbench is combined with the fix seat. The reinforcement device is disposed between the front board and the rear board, and connected with the adjustment seat.

In another embodiment of the present invention, the adjustment seat is disposed between the front board and the rear board through two first combination rods; the reinforcement device comprises a reinforcement rod and a fasten assembly; two ends of the reinforcement rod are fastened to the front board and the rear board, respectively; the fasten assembly is fastened between the reinforcement rod and one of the first combination rods.

In another embodiment of the present invention, the reinforcement rod is arranged in parallel to the first combination rod fastened therewith; two fasten assemblies are included and fastened between the reinforcement rod and two ends of the first combination rod.

In another embodiment of the present invention, the fasten assembly comprises a fastener passing through the reinforcement rod and the first combination rod, and a thread member screwed to the fastener.

In another embodiment of the present invention, two thread members are included; when being fastened, the two thread members are arranged on two sides of the first combination rod.

In another embodiment of the present invention, the adjustment seat is disposed between the front board and the rear board through two first combination rods; the fix seat is disposed between the front board and the rear board through two second combination rods; the reinforcement device comprises four reinforcement rods and a plurality of fasten assemblies; two ends of the reinforcement rods are fastened to the front board and the rear board, respectively; the fasten assemblies are fastened between the two reinforcement rods and the two first combination rods; and the fasten assemblies are fastened between the two reinforcement rods and the two second combination rods.

In another embodiment of the present invention, two of the reinforcement rods are arranged in parallel to the two first combination rods, and the other two of the reinforcement rods are arranged in parallel to the two second combination rods; the fasten assemblies comprise a plurality of fasteners passing through the reinforcement rods and the first combination rods, a plurality of fasteners passing through the reinforcement rods and the second combination rods, and a plurality of thread members screwed to the fasteners.

With such configuration, the reinforcement device is connected between the base and the adjustment seat or between the base and the fix seat to improve the structural strength, preventing the vibration effect generated by the planning operation, and achieving a greater stableness of the base.

DETAILED DESCRIPTION OF THE INVENTION

Figure 1:
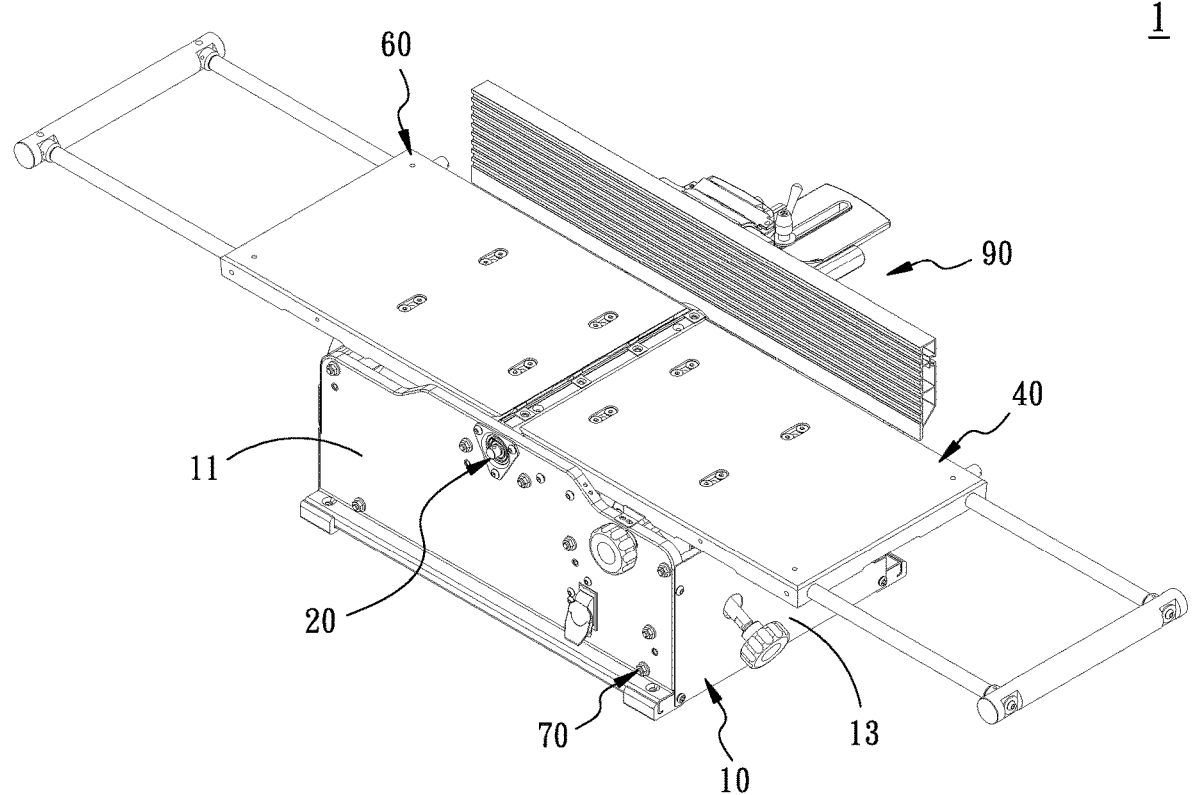
FIG. 1 is a perspective view of the hand-press planer in accordance with an embodiment of the present invention.

The aforementioned and further advantages and features of the present invention will be understood by reference to the description of the preferred embodiment in conjunction with the accompanying drawings where the components are illustrated based on a proportion for explanation but not subject to the actual component proportion. Also, to improve the readability, some of the components are omitted or drawn using imaginary lines in some illustrations. Also, in the following description, elements having identical functions and composition are assigned with the same reference numbers and symbols, and repeated descriptions are omitted.

Referring to FIG. 1 to FIG. 10, an embodiment of the present invention discloses a hand-press planer 1, comprising a base 10, a tool shaft 20, an elevation adjustment device 30, a first workbench 40, a fix seat 50, a second workbench 60, and a reinforcement device 70.

The base 10 comprises a front board 11 and a rear board 12, with a side board 13 connected between two sides of the front board 11 and the rear board 12, respectively. Also, for the simplicity and clarity of drawings, the front board 11 and the side board 13 on the right side are omitted in FIG. 2.

The tool shaft 20 is rotatably disposed on the base 10 and arranged between the first workbench 40 and the second workbench 60. In an embodiment, the to-be-processed wood is inputted from the first workbench 40 to be planned by the tool shaft 20 and outputted through the second workbench 60. Therein, the driving method of the tool shaft 20 is a conventional art and therefore omitted here.

The elevation adjustment device 30 is disposed on one end of the base 10 and comprises an adjustment seat 31 and a movement seat 32. The adjustment seat 31 is disposed between the front board 11 and the rear board 12. The movement seat 32 is disposed on the adjustment seat 31 and allowed to generate a rising and lowering movement. Therein, the adjustment seat 31 is disposed between the front board 11 and the rear board 12 in a tilting arrangement through two first combination rods 14. The adjustment seat 31 is assembled with the movement seat 32 through a thread rod 312 and a guide rod 311, such that the thread rod 312 is rotated to drive the movement seat 32 to rise or lower with respect to the adjustment seat 31.

The movement seat 32 comprises a plurality of first adjustment bores 321 and a plurality of first fasten bores 322 arranged in parallel to it on the top part thereof. In the embodiment, the movement seat 32 comprises a first adjustment bore 321 and two first fasten bores 322 at four corners thereof, respectively, wherein the first adjustment bore 321 is arranged between the two first fasten bores 322. Both the first adjustment bore 321 and the first fasten bore 322 are thread bores.

The first workbench 40 is combined with the movement seat 32, such that the first workbench 40 rises and lowers together with the movement seat 32.

Figure 2:
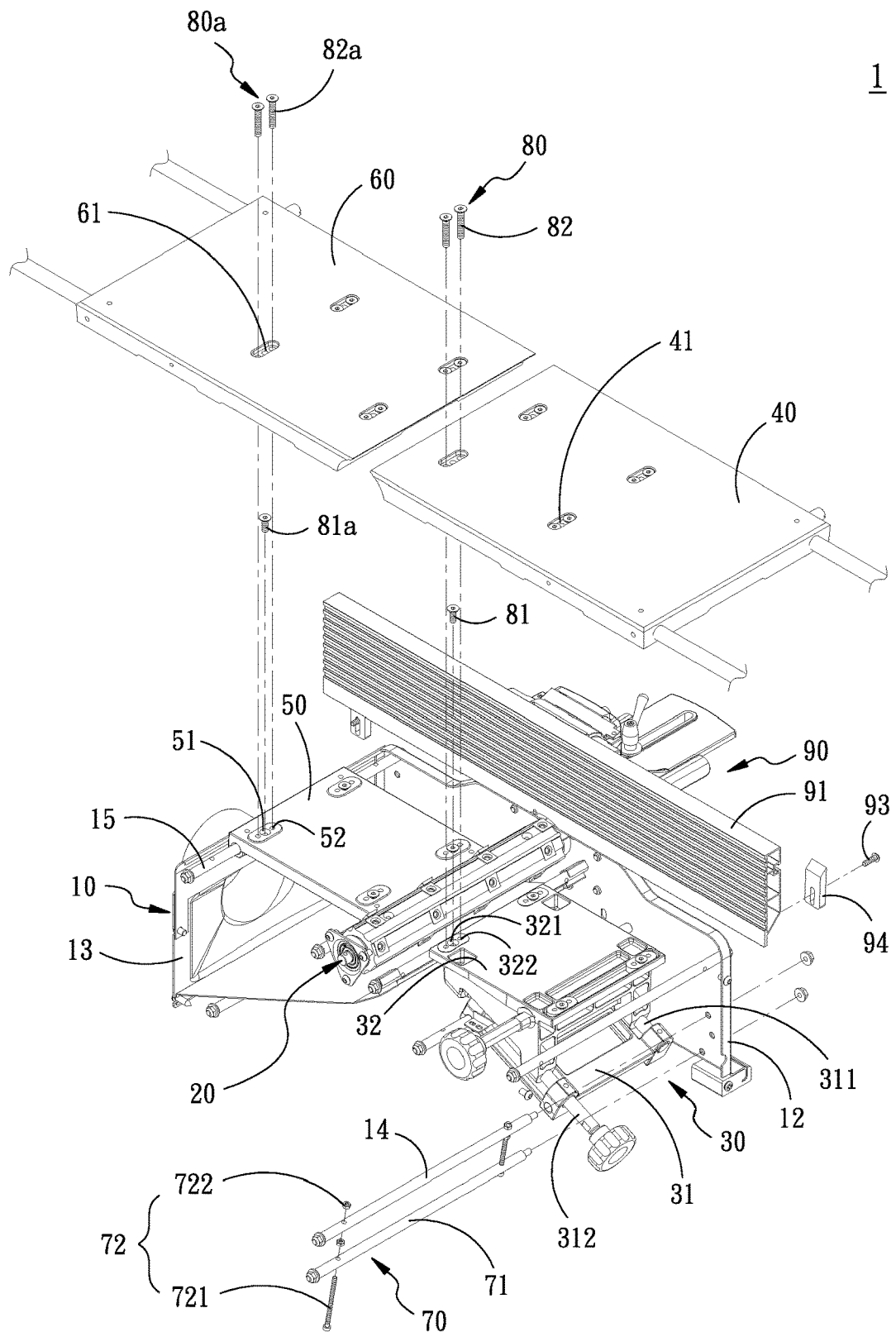
FIG. 2 is an exploded view of the hand-press planer in accordance with an embodiment of the present invention.
Figure 3:
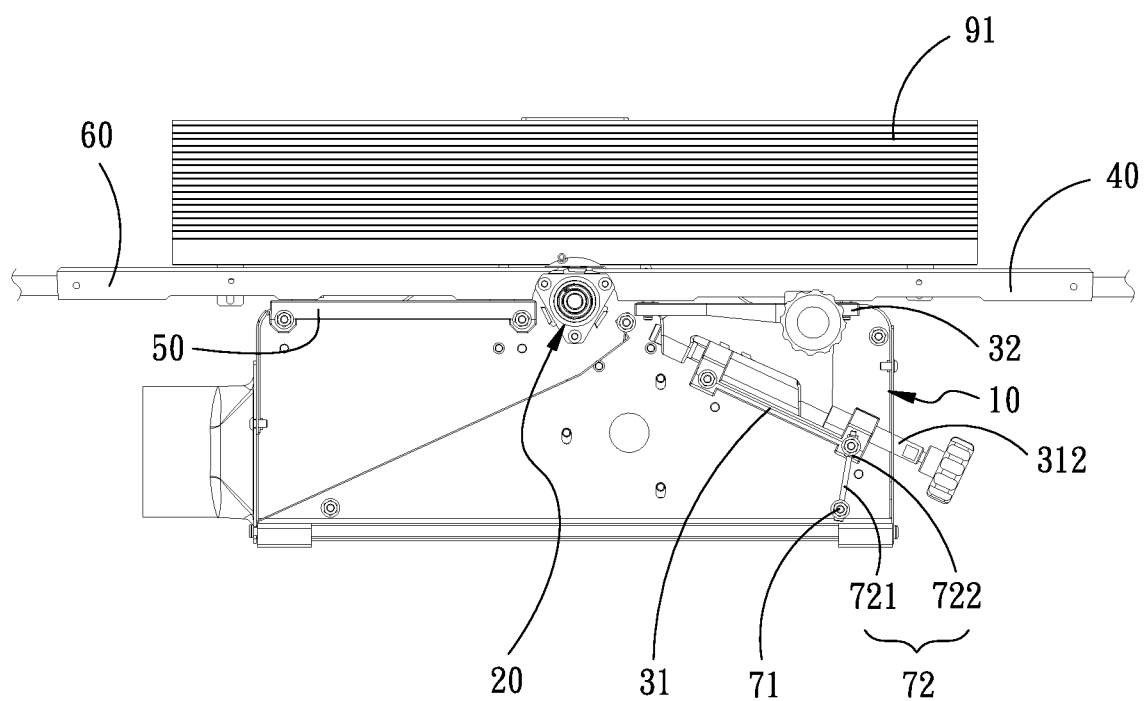
FIG. 3 is a front view of the hand-press planer in accordance with an embodiment of the present invention, illustrating the internal structure of the base.
Figure 4:
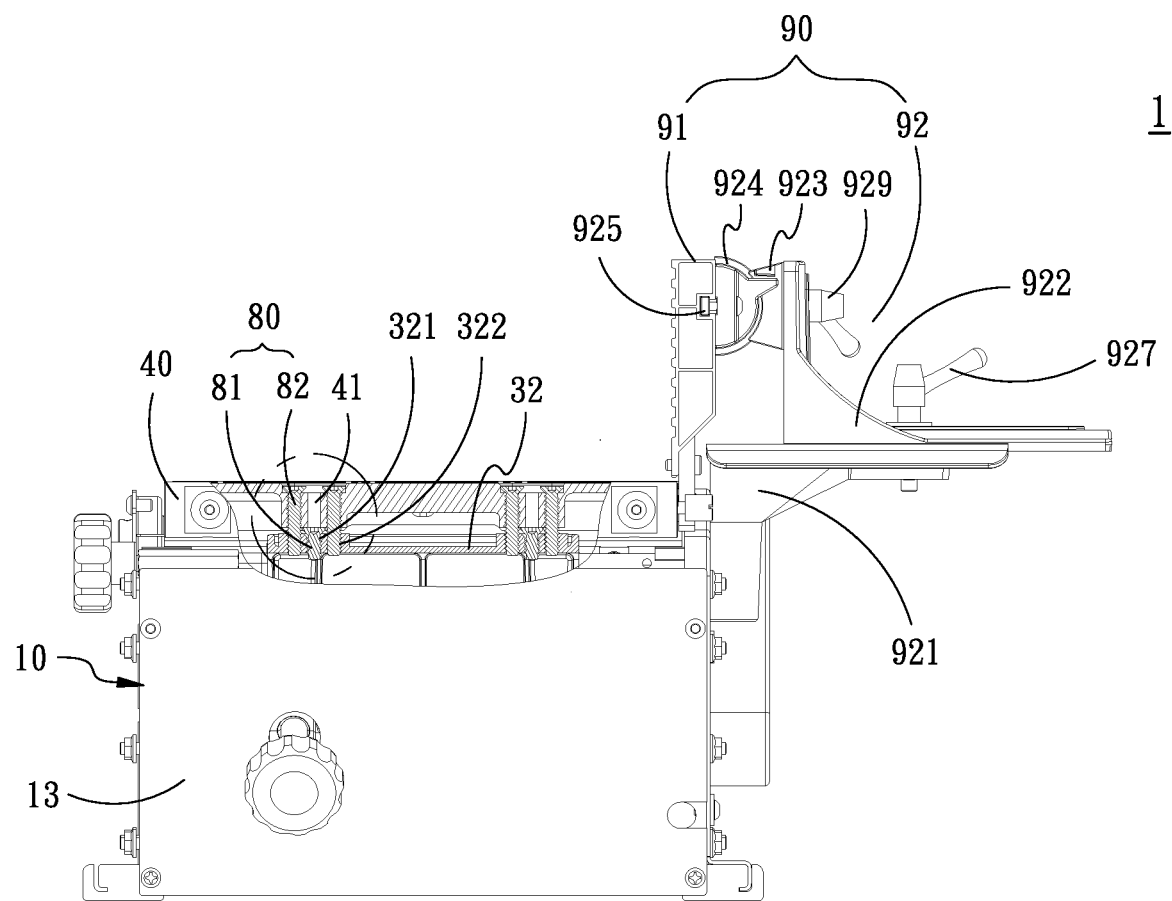
FIG. 4 is a partially sectional view taken along the width direction of the hand-press planer in accordance with an embodiment of the present invention, illustrating the structure of the first workbench and the elevation adjustment device.
Figure 5:
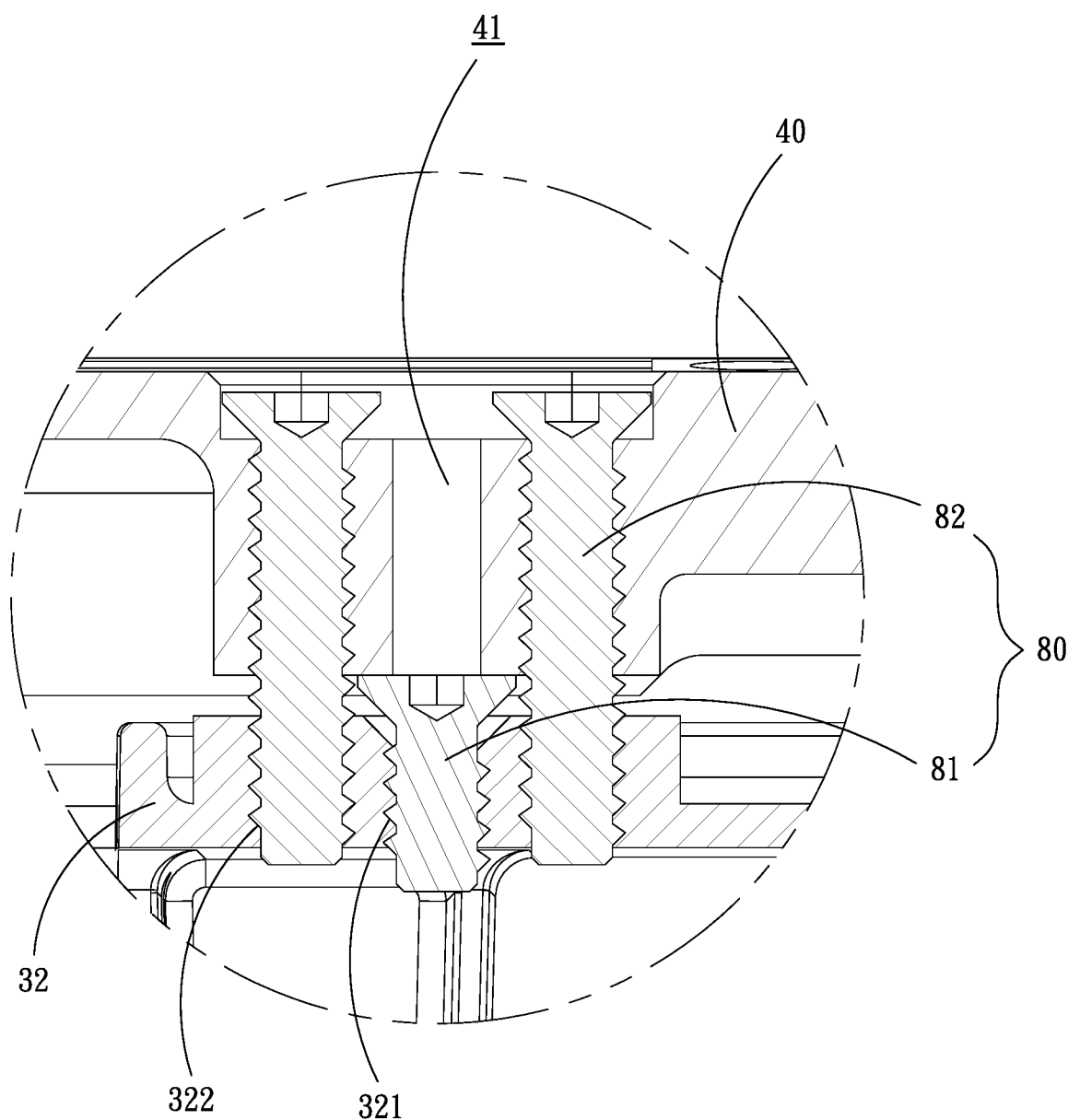
FIG. 5 is a partially enlarged view of FIG. 4, illustrating the combination relationship between the first workbench and the movement seat.

Referring to FIG. 2, FIG. 4 and FIG. 5, in the embodiment, a first fine adjustment set 80 is included and disposed between the movement seat 32 and the first workbench 40 to fine adjust the height of the first workbench 40. The first fine adjustment set 80 comprises a plurality of first adjustment members 81 and a plurality of first locking members 82. The first adjustment members 81 are screwed to the first adjustment bore 321 and abut against the first workbench 40, and the first adjustment member 81 is allowed to rise and lower with respect to the movement seat 32. The first locking members 82 pass through the first workbench 40 to be combined with the first fasten bores 322. Therein, the first workbench 40 comprises a plurality of first operation bores 41 disposed in coaxial arrangement with the first adjustment bore 321. The first adjustment members 81 and the first locking members 82 are screw members.

The fix seat 50 is disposed on another end of the base 10, and arranged between the front board 11 and the rear board 12 through two second combination rods 15. Therein, the fix seat 50 comprises a plurality of second adjustment bores 51 and a plurality of second fasten bores 52 arranged in parallel to it on the top part thereof. In the embodiment, the fix seat 50 comprises a second adjustment bore 51 and two second fasten bores 52 at the four corners thereof, respectively, wherein the second adjustment bore 51 is arranged between the two second fasten bores 52. The second adjustment bores 51 and the second fasten bores 52 are thread bores.

The second workbench 60 is combined with the fix seat 50.

In the embodiment, a second fine adjustment set 80a is included and disposed between the fix seat 50 and the second workbench 60 for fine adjusting the height of the second workbench 60. The second fine adjustment set 80a is structurally identical to the first fine adjustment set 80. The second fine adjustment set 80a comprises a plurality of second adjustment member 81a and a plurality of second locking members 82a. The second adjustment members 81a are disposed in the second adjustment bores 51 to abut against the second workbench 60, and the second adjustment members 81a are allowed to rise and lower with respect to the fix seat 50. The second locking members 82a pass through the second workbench 60 and combine with the second fasten bores 52. Therein, the second workbench 60 comprises a plurality of second operation bores 61 disposed in coaxial arrangement with the second adjustment bores 51. The second adjustment members 81a and the second locking members 82a are screw members.

Figure 6:
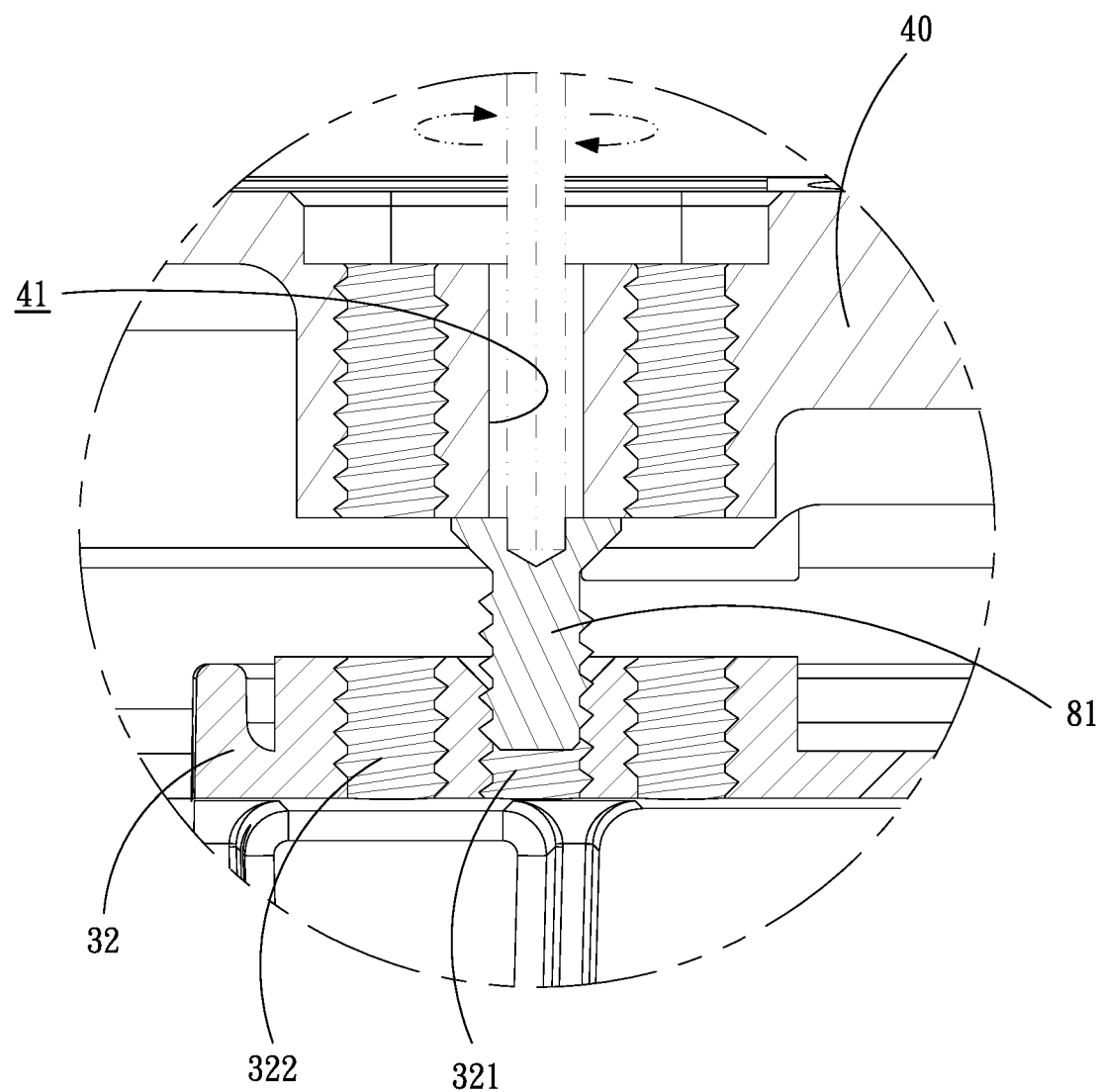
FIG. 6 is a schematic view of the first fine adjustment set in accordance with an embodiment of the present invention, illustrating the adjustment operation of the first adjustment member after the first locking member being removed.
Figure 7:
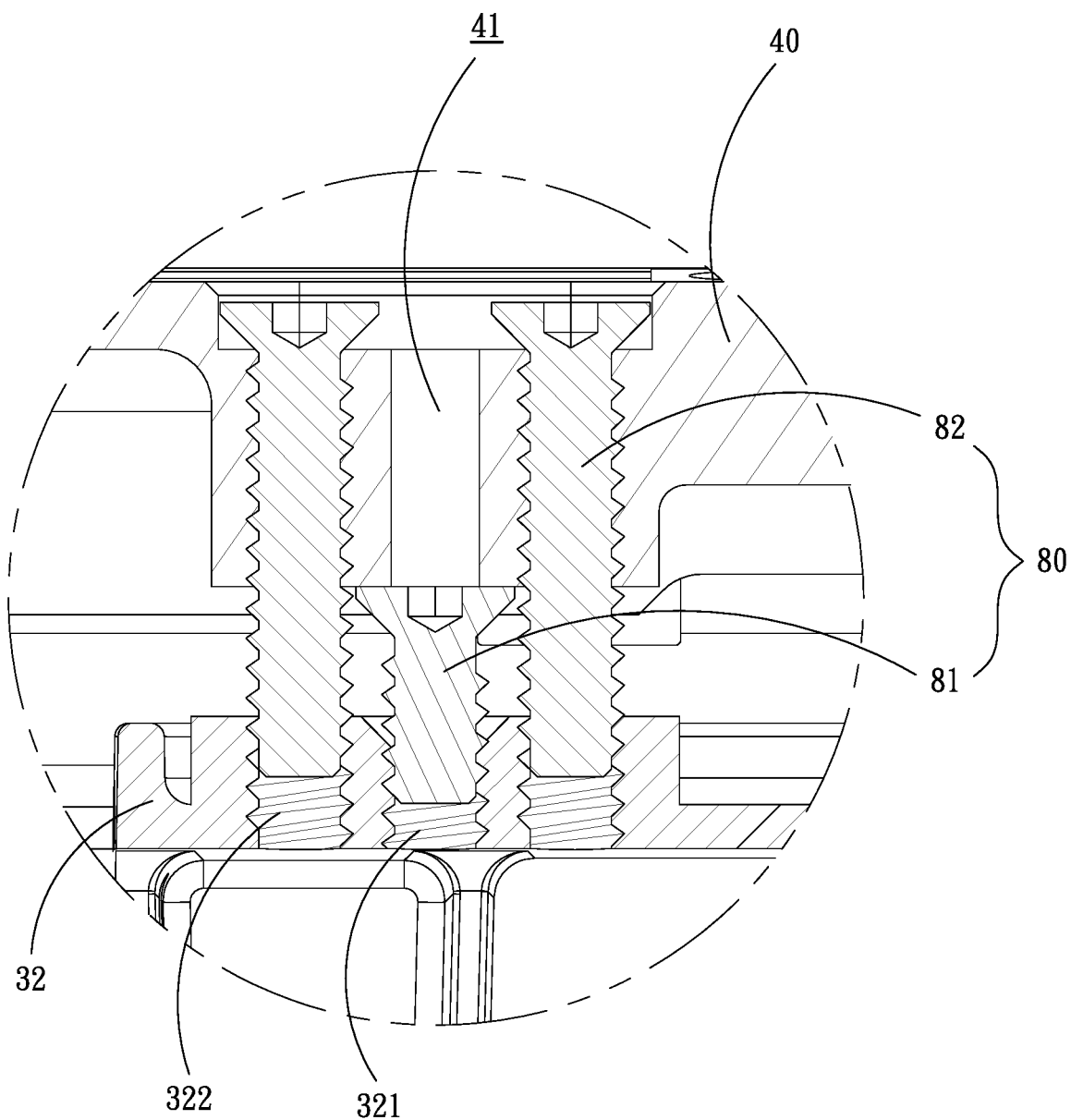
FIG. 7 is a schematic view in accordance with an embodiment of the present invention, illustrating the first workbench after being adjusted upward with respect to the movement seat.

Referring to FIG. 6 and FIG. 7, the adjustment operation of the first fine adjustment set 80 is schematically illustrated. First, the first locking members 82 are removed, and a tool is inserted into the first operation bore 41 to drive the first adjustment members 81, such that, through the screwed combination between the first adjustment member 81 and the first adjustment bore 321, the first adjustment member 81 pushes up the first workbench 40, so as to fine adjust the longitudinal position of the first workbench 40, thereby fine adjusting the horizontal status of the first workbench 40, as shown by FIG. 6. Referring to FIG. 7, afterward, the first locking members 82 are then screwed back to the first fasten bores 322 to be positioned, finishing the whole fine adjustment operation.

Therein, the adjustment method of the second fine adjustment set 80a is identical to that of the first fine adjustment set 80, so it is omitted. Therefore, the height of the second workbench 60 is fine adjusted through the adjustment of the second fine adjustment set 80a, whereby the relative horizontal level between the first workbench 40 and the second workbench 60 is adjusted.

The reinforcement device 70 is disposed between the front board 11 and the rear board 12 and connected between the adjustment seat 31 and the base 10, so as to improve the structural strength of the adjustment seat 31 disposed on the base 10. In the embodiment, the reinforcement device 70 comprises a reinforcement rod 71 and a fasten assembly 72. Two ends of the reinforcement rod 71 are fastened to the front board 11 and the rear board 12, respectively. The fasten assembly 72 is fastened between the reinforcement rod 71 and one of the first combination rods 14 and arranged in parallel to said first combination rod 14; as shown by FIG. 2, the fasten assembly 72 is fastened between the first combination rod 14 on the right side and the reinforcement rod 71. Therein, two fasten assemblies 72 are included and fastened between the reinforcement rod 71 and two ends of the first combination rod 14. In another embodiment, the fasten assembly 72 comprises a fastener 721 passing through the reinforcement rod 71 and the first combination rod 14 and a thread member 722 screwed to the fastener 721. A plurality of thread members 722 are included. When screwed, the two thread members 722 are arranged on two sides of the first combination rod 14, respectively.

Figure 8:
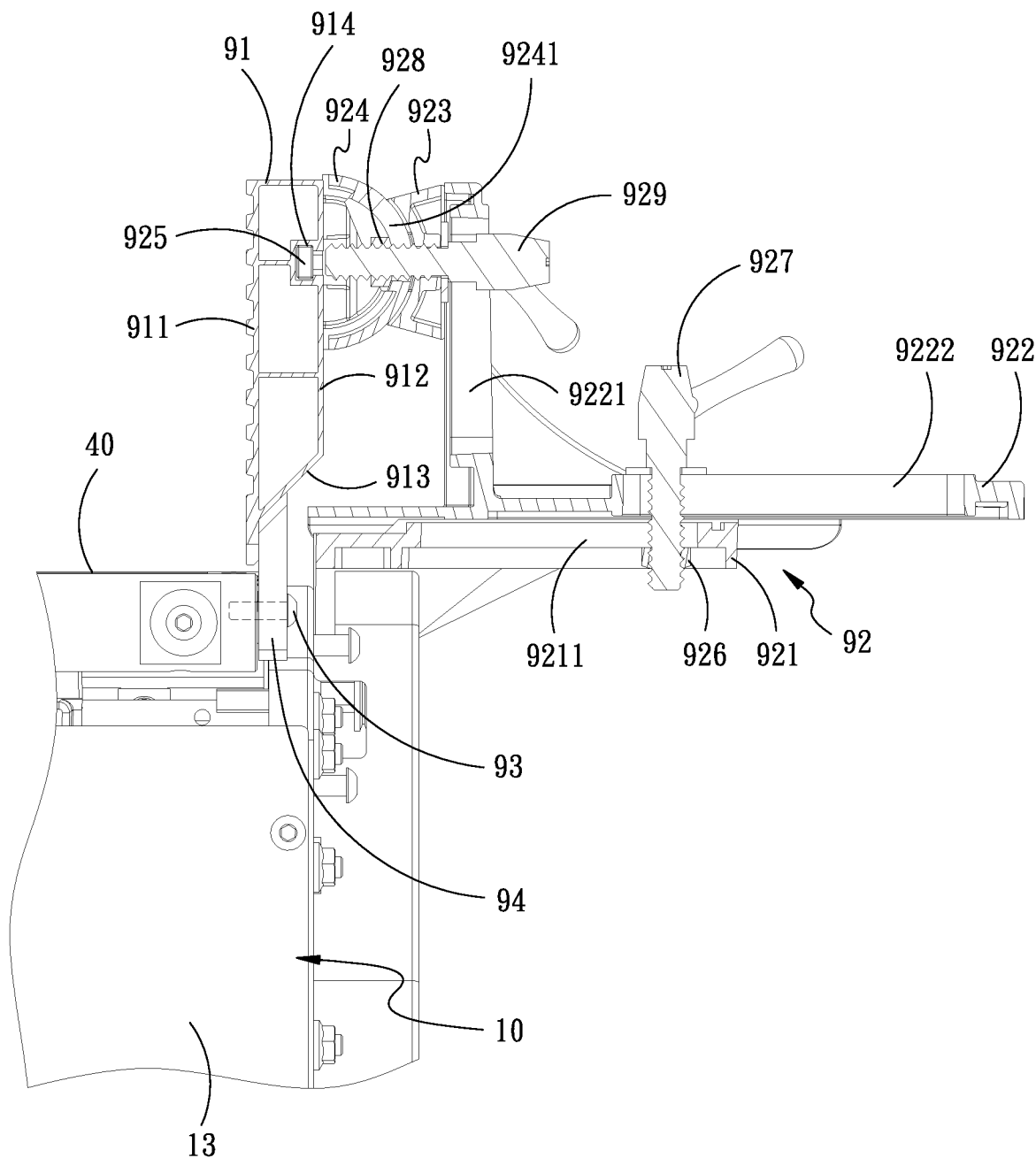
FIG. 8 is another sectional view taken along the width direction of the hand-press planer in accordance with an embodiment of the present invention, illustrating the structure of the guide board device.
Figure 10:
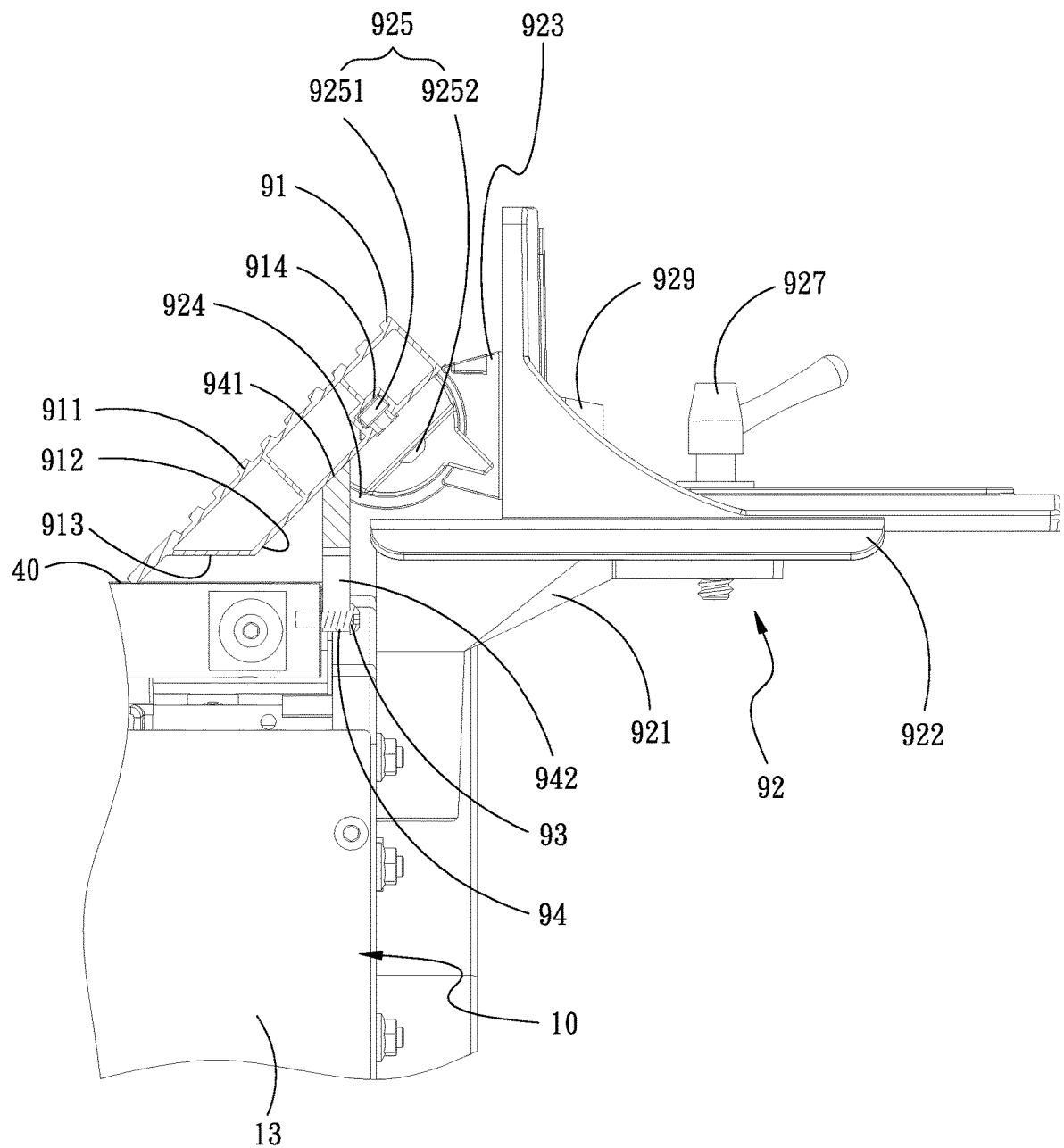
FIG. 10 is a schematic view of the guide board combined with the first workbench in accordance with an embodiment of the present invention, illustrating the guide board arranged tilting with respect to the base.

Referring to FIG. 2, FIG. 8, and FIG. 10, in the embodiment, a guide board device 90 is further included, comprising a guide board 91 and an angle support seat 92. The guide board 91 is disposed along the length direction of the first workbench 40 and the second workbench 60. The angle support seat 92 supports the guide board 91 and allows the guide board 91 to be arranged in vertical or tilting with respect to the base 10. The tilting guide board 91 facilitates the wood planning operation of different angles.

The guide board 91 is formed of an aluminum extrusion, and comprises a resting face 911 and an opposite back face 912. A bevel 913 is disposed between the back face 912 and the resting face 911 in adjacent to the bottom part of the guide board 91. A position limiting groove 914 is concavely disposed on the back face 912 along the length direction thereof.

Referring to FIG. 8, the angle support seat 92 comprises a fix member 921, a slide member 922, an elevation member 923, and a connection member 924. The fix member 921 is formed in an L shape and combined with the rear board 12. The slide member 922 is slidably disposed on the fix member 921. The elevation member 923 is longitudinally and slidably disposed at the front part of the slide member 922. The connection member 924 is fitted with the elevation member 923 in an arc shape structural match, so that the connection member 924 is slidably disposed on the elevation member 923 and connected with the back face 912 of the guide board 91. Therein, an anti-detachment assembly 925 is disposed between the connection member 924 and the position limiting groove 914 to maintain the connection relationship between the connection member 924 and the guide board 91. In an embodiment, the anti-detachment assembly 925 comprises a blocker 9251 and a screw member 9252 fastened to the blocker 9251.

The angle support seat 92 further comprises a first pressing block 926, a first rotation rod 927, a second pressing block 928, and a second rotation rod 929. The fix member 921 comprises a first long groove 9211. The slide member 922 comprises a longitudinal groove 9221 and a second long groove 9222. The connection member 924 comprises an arc shape slide groove 9241. Therein, the second rotation rod 929 passes through the longitudinal groove 9221 and the arc shape slide groove 9241 of the connection member 924 to be screwed to the second pressing block 928, such that the second rotation rod 929 optionally forces the connection member 924 toward the elevation member 923 to achieve a position limiting effect, whereby the height of the elevation member 923 with respect to the slide member 922 is adjusted, and the connection member 924 is disposed to be swayable with respect to the slide member 922, so as to adjust the tilt angle of the guide board 91 with respect to the first workbench 40. The first rotation rod 927 passes through the second long groove 9222 of the slide member 922 and the first long groove 9211 of the fix member 921 to be screwed to the first pressing block 926, such that the first rotation rod 927 optionally forces the slide member 922 toward the fix member 921 to achieve a position limiting effect, whereby the horizontal position of the slide member 922 with respect to the fix member 921 is adjusted.

Figure 9:
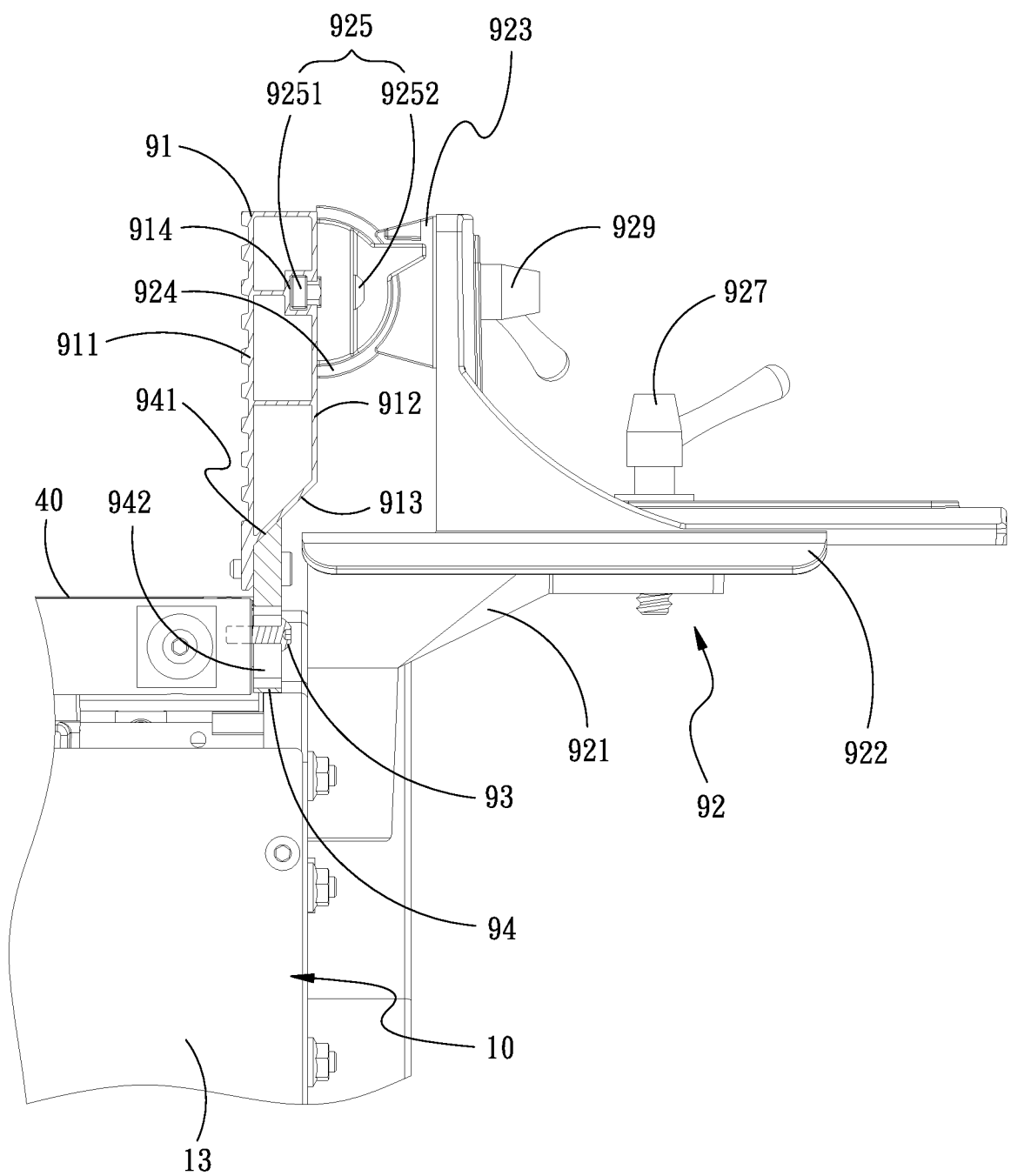
FIG. 9 is a schematic view of the guide board combined with the first workbench in accordance with an embodiment of the present invention, illustrating the guide board arranged in vertical to the base.

The guide board device 90 further comprises two bolts 93 and two holding members 94, and each holding member 94 has a slop portion 941. Each holding member 94 is fastened to the first workbench 40 or the second workbench 60 through the bolt 93, respectively, wherein one of the holding members 94 is combined to the rear side of the first workbench 40 and the other holding member 94 is combined to the rear side of the second workbench 61. Therefore, as shown by FIG. 9, when the guide board 91 is vertical with respect to the base 10, the slope portions 941 of the two holding members 94 hold the bevel 913. As shown by FIG. 10, when the guide board 91 tilts with respect to the base 10, the slope portions 941 of the two holding members 94 hold the back face 912.

Each of the two holding members 94 has a slide groove 942, so that the two holding members 94 are allowed to be longitudinally adjusted and moved with respect to the base 10.

Figure 11:
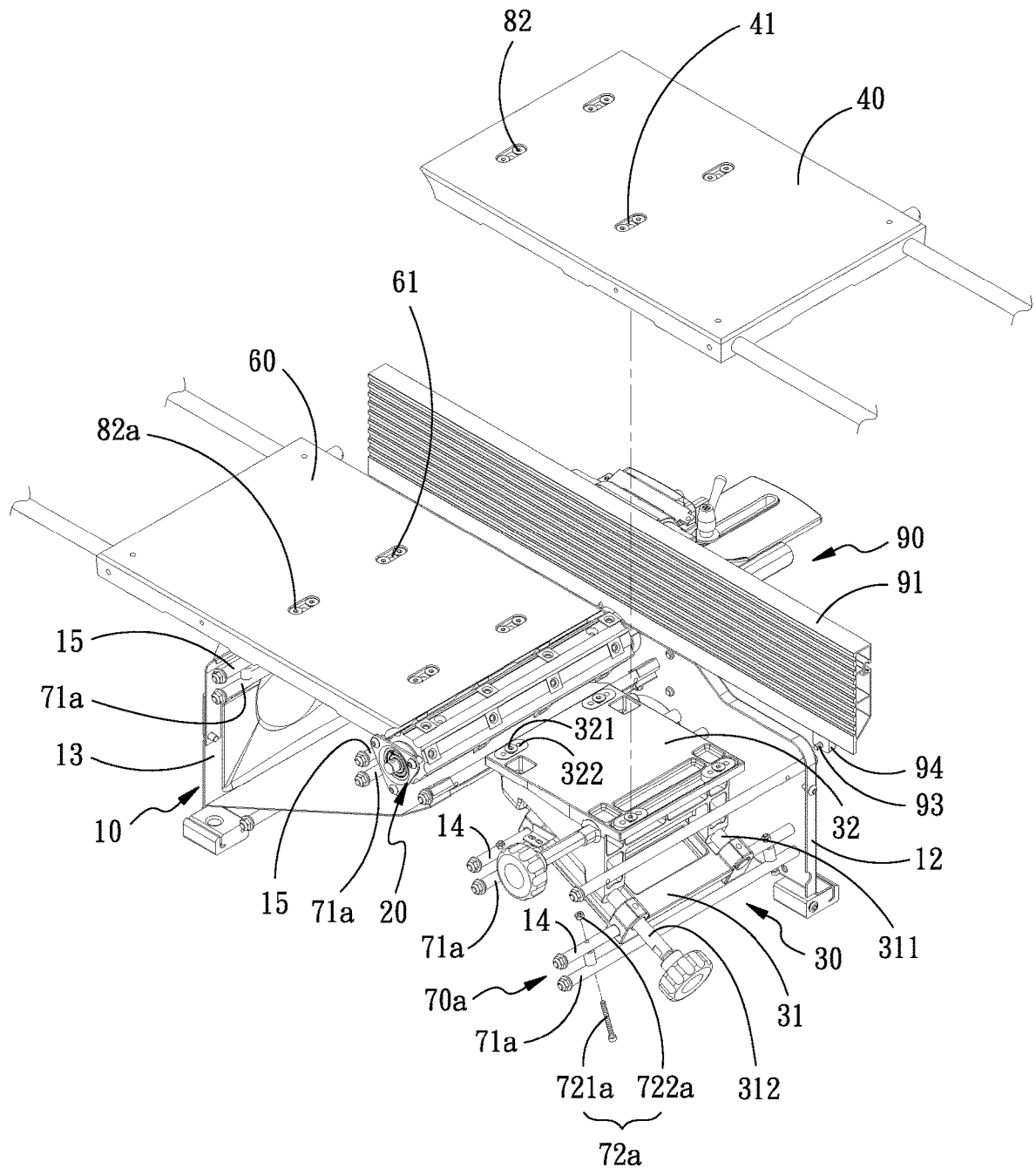
FIG. 11 is a front view of the hand-press planer in accordance with another embodiment of the present invention, illustrating the internal structure of the base.

Referring to FIG. 11, the second embodiment of the present invention discloses a hand-press planer 1a. The difference with the first embodiment lies in that a reinforcement device 70a comprises four reinforcement rods 71a and a plurality of fasten assemblies 72a. Two ends of the reinforcement rods 71a are fastened to the front board 11 and the rear board 12, respectively. The fasten assemblies 72a are fastened between the two reinforcement rods 71a and the two first combination rods 14 or between the two reinforcement rods 71a and the two second combination rods 15. Therein, two of the reinforcement rods 71a are arranged in parallel to the two first combination rods 14, and the other two of the reinforcement rods 71a are arranged in parallel to the two second combination rods 15. The fasten assembly 72a comprises a plurality of fasteners 721a passing through the reinforcement rods 71a and the first combination rods 14 or passing through the reinforcement rods 71a and the second combination rods 15, and a plurality of thread members 722a screwed to the fastener 721a. Therefore, the structural strength of the adjustment seat 31 disposed on the base 10 is improved, and the structural strength of the fix seat 50 disposed on the base 10 is also improved.

With the structure arrangement of the reinforcement device 70, 70a, the overall structural strength is improved, thereby preventing the vibration effect generated by the planning operation and improving the stableness of the base 10, facilitating an accurate wood planning operation.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A hand-press planer, comprising:
a base comprising a front board and a rear board;
a tool shaft rotatably disposed on the base;
an elevation adjustment device, disposed on one end of the base, comprising an adjustment seat and a movement seat, wherein the adjustment seat is disposed between the front board and the rear board through two first combination rods, and the movement seat is disposed on the adjustment seat to generate a relative rising and lowering movement;
a first workbench combined with the movement seat;
a fix seat disposed on another end of the base and arranged between the front board and the rear board;
a second workbench combined with the fix seat; and
a reinforcement device, disposed between the front board and the rear board, and connected with the adjustment seat, wherein the reinforcement device comprises a reinforcement rod and a fasten assembly, two ends of the reinforcement rod are fastened to the front board and the rear board respectively, and the fasten assembly is fastened between the reinforcement rod and one of the first combination rods.

2. The hand-press planer of claim 1, wherein the reinforcement rod is arranged in parallel to the first combination rod fastened therewith; two fasten assemblies are included and fastened between the reinforcement rod and two ends of the first combination rod.

3. The hand-press planer of claim 1, wherein the fasten assembly comprises a fastener passing through the reinforcement rod and the first combination rod, and a thread member screwed to the fastener.

4. The hand-press planer of claim 3, wherein two thread members are included; when being fastened, the two thread members are arranged on two sides of the first combination rod.

5. A hand-press planer, comprising:
a base comprising a front board and a rear board;
a tool shaft rotatably disposed on the base;
an elevation adjustment device, disposed on one end of the base, comprising an adjustment seat and a movement seat, wherein the adjustment seat is disposed between the front board and the rear board through two first combination rods, and the movement seat is disposed on the adjustment seat to generate a relative rising and lowering movement;
a first workbench combined with the movement seat;
a fix seat disposed on another end of the base and arranged between the front board and the rear board through two second combination rods;
a second workbench combined with the fix seat; and
a reinforcement device, disposed between the front board and the rear board, and connected with the adjustment seat: comprising:
four reinforcement rods; and
a plurality of fasten assemblies;
wherein two ends of the reinforcement rods are fastened to the front board and the rear board respectively, the fasten assemblies are fastened between the two reinforcement rods and the two first combination rods, and the fasten assemblies are also fastened between the two reinforcement rods and the two second combination rods.

6. The hand-press planer of claim 5, wherein two of the reinforcement rods are arranged in parallel to the two first combination rods, and the other two of the reinforcement rods are arranged in parallel to the two second combination rods; the fasten assemblies comprises a plurality of fasteners passing through the reinforcement rods and the first combination rods, a plurality of fasteners passing through the reinforcement rods and the second combination rods, and a plurality of thread members screwed to the fasteners.

7. A hand-press planer, comprising:
a base comprising a front board and a rear board;
a tool shaft rotatably disposed on the base;
an elevation adjustment device disposed on one end of the base, and comprising an adjustment seat and a movement seat, the adjustment seat disposed between the front board and the rear board, the movement seat disposed on the adjustment seat to generate a relative rising and lowering movement, wherein the movement seat comprises a plurality of first adjustment bores and a plurality of parallel first fasten bores;
a first workbench, combined with the movement seat, comprising a plurality of first operation bores disposed in a coaxial arrangement with the first adjustment bores:
a fix seat disposed on another end of the base and arranged between the front board and the rear board;
a second workbench combined with the fix seat;
a reinforcement device disposed between the front board and the rear board, and connected with the adjustment seat; and
a first fine adjustment set disposed between the movement seat and the first workbench for fine adjusting a height of the first workbench, comprising:
a plurality of first adjustment members disposed in the first adjustment bores, wherein the first adjustment members abut against the first workbench, and are configured to rise and lower with respect to the movement seat; and
a plurality of first locking members, wherein the first locking members pass through the first workbench to be combined in the first fasten bores.

8. The hand-press planer of claim 7, wherein the first adjustment bores and the first fasten bores are thread bores; the first adjustment members and the first locking members are screw members.

9. The hand-press planer of claim 7, further comprising a second fine adjustment set disposed between the fix seat and the second workbench for fine adjusting a height of the second workbench.

10. The hand-press planer of claim 9, wherein the second fine adjustment set comprises a plurality of second adjustment members and a plurality of second locking members; the fix seat comprises a plurality of second adjustment bores and a plurality of parallel second fasten bores; the second adjustment members are disposed in the second adjustment bores; the second adjustment members abut against the second workbench, and are configured to rise and lower with respect to the fix seat; the second locking members pass through the second workbench to be combined in the second fasten bores; the second workbench comprises a plurality of second operation bores disposed in a coaxial arrangement with the second adjustment bores.

11. The hand-press planer of claim 10, wherein the second adjustment bores and the second fasten bores are thread bores; the second adjustment members and the second locking members are screw members.

12. The hand-press planer of claim 1, wherein a guide board device is disposed on an upper side of the rear board; the guide board device comprises a guide board and an angle support seat; the guide board is disposed along a length direction of the first workbench and the second workbench; the angle support seat supports the guide board, allowing the guide board to be arranged in vertical or tilting with respect to the base.

13. The hand-press planer of claim 12, wherein the guide board comprises a resting face and an opposite back face; the angle support seat comprises a fix member combined with the rear board, a slide member slidably disposed on the fix member, an elevation member longitudinally and slidably disposed on the slide member, a connection member slidably and swayably disposed on the elevation member; the connection member is connected with the back face.

14. The hand-press planer of claim 13, wherein the guide board device further comprises two holding members; a bevel is disposed between the back face and the resting face; each of the two holding members comprises a slope portion; the two holding members are combined with the first workbench and the second workbench, respectively; when the guide board is vertical with respect to the base, the slope portions of the two holding members hold the bevel; when the guide board tilts with respect to the base, the slope portions of the two holding members hold the back face.

15. The hand-press planer of claim 14, wherein each of the two holding members comprises a slide groove, such that the two holding members are longitudinally adjusted with respect to the base.

16. The hand-press planer of claim 14, wherein the angle support seat further comprises a first pressing block and a first rotation rod; the fix member comprises a first long groove; the slide member comprises a second long groove; the first rotation rod passes through the second long groove of the slide member and the first long groove of the fix member to be screwed to the first pressing block; the first rotation rod is configured to force the slide member toward the fix member to achieve a position limiting effect.

17. The hand-press planer of claim 16, wherein the connection member is fitted with the elevation member in an arc shape structural match; the angle support seat further comprises a second pressing block and a second rotation rod; the slide member comprises a longitudinal groove; the connection member comprises an arc shape slide groove; the second rotation rod passes through the longitudinal groove of the slide member and the arc shape slide groove of the connection member to be screwed to the second pressing block; the second rotation rod is configured to force the connection member toward the elevation member to achieve a position limiting effect, whereby the connection member is disposed to be swayable with respect to the slide member.

18. The hand-press planer of claim 17, wherein a position limiting groove is concavely disposed on the back face; an anti-detachment assembly is disposed between the connection member and the position limiting groove.

* * * * *